US008950888B2

(12) United States Patent
Halliburton

(10) Patent No.: US 8,950,888 B2
(45) Date of Patent: Feb. 10, 2015

(54) ATTACHMENT DEVICE FOR ATTACHMENT TO A MEMBRANE, E.G. OF A BALLOON, WITHOUT PUNCTURING THE MEMBRANE

(75) Inventor: James Halliburton, Crew Cheshire (GB)

(73) Assignee: Seatriever International Holdings Limited, Cheshire (GB)

( * ) Notice: Subject to any disclaimer, the term of this patent is extended or adjusted under 35 U.S.C. 154(b) by 179 days.

(21) Appl. No.: 13/576,467

(22) PCT Filed: Feb. 7, 2011

(86) PCT No.: PCT/GB2011/000161

§ 371 (c)(1),
(2), (4) Date: Aug. 23, 2012

(87) PCT Pub. No.: WO2011/095788

PCT Pub. Date: Aug. 11, 2011

(65) Prior Publication Data

US 2012/0314406 A1 Dec. 13, 2012

(30) Foreign Application Priority Data

Feb. 8, 2010 (GB) .................................. 1002031.1

(51) Int. Cl.

| | |
|---|---|
| ***F21L 4/00*** | (2006.01) |
| ***A63H 3/06*** | (2006.01) |
| ***B64B 1/40*** | (2006.01) |
| ***A63H 27/10*** | (2006.01) |
| ***F21V 3/02*** | (2006.01) |
| ***F21V 17/16*** | (2006.01) |

(52) U.S. Cl.

CPC ................ *A63H 27/10* (2013.01); *F21V 3/026* (2013.01); *F21V 17/16* (2013.01); *A63H 2027/1008* (2013.01); *A63H 2027/1058* (2013.01); *Y10S 362/806* (2013.01)

USPC ........... 362/189; 362/363; 362/806; 362/477; 244/31; 446/220; 446/485; 441/30

(58) Field of Classification Search

CPC ............ F21L 4/00; F21L 15/08; F21V 3/023; F21V 3/026; F21V 17/06; F21V 17/16; F21V 21/0885; F21W 2121/00; A63H 27/10; A63H 2027/1058; A63H 3/06; B64B 1/40

USPC ................. 362/189, 186, 363, 565, 806, 477; 446/220, 485; 244/31; 441/13, 30

See application file for complete search history.

(56) References Cited

U.S. PATENT DOCUMENTS 2,383,390 A * 8/1945 Jacobs ............................ 40/214
4,617,771 A 10/1986 Tomaszewski (Continued)

FOREIGN PATENT DOCUMENTS

CN 1180808 5/1998
WO 2008/110832 9/2008

*Primary Examiner* — Peggy Neils
(74) *Attorney, Agent, or Firm* — Clark & Brody

(57) ABSTRACT

An attachment device for attachment to a membrane without puncturing the membrane. It comprises two interengaging parts (10, 12) and an O-ring (50) held by the interengaging parts (10, 12) when the device is in use. The interengaging parts (10, 12) are movable relative to one another from a position in which they are able to receive the O-ring (50) to a position in which they trap the O-ring (50). As a result, when the device is attached to a membrane (52), the interengaging parts (10, 12) can be located on one side of the membrane (52) with the O-ring (50) on the other side of the membrane (52) adjacent to the interengaging parts (10, 12), and the O-ring (50) can be slipped over at least one of the interengaging parts (10, 12) with the membrane (52) extending between the O-ring (50) and at least one of the interengaging parts (10, 12). In this way the O-ring (50) is received by the interengaging parts (10, 12), whereupon the interengaging parts (10, 12) may be moved relative to one another so that they trap the O-ring (50) and with it portions of the membrane (52), to secure attachment of the attachment device to the membrane (52).

21 Claims, 11 Drawing Sheets

(56) References Cited

U.S. PATENT DOCUMENTS

| | | | | | |
|---|---|---|---|---|---|
| 5,215,492 | A | | 6/1993 | Kubiatowicz | |
| 5,947,581 | A | * | 9/1999 | Schrimmer et al. | 362/96 |
| 7,922,116 | B2 | * | 4/2011 | Nguyen et al. | 244/31 |
| 8,297,778 | B2 | * | 10/2012 | Jeffrey | 362/189 |
| 2013/0062458 | A1 | * | 3/2013 | Shenhar | 244/31 |

* cited by examiner

ATTACHMENT DEVICE FOR ATTACHMENT TO A MEMBRANE, E.G. OF A BALLOON, WITHOUT PUNCTURING THE MEMBRANE

The present invention relates to an attachment device for attachment to a membrane without puncturing the membrane.

One construction of such a device which has already been proposed comprises a shoulder portion, a neck portion extending from the shoulder portion, and a head portion spaced from the shoulder portion. The shoulder, neck and head portions are provided as parts of a single integral plastics injection moulding. When in use the device is attached to the membrane of a balloon. To accomplish this, the head portion is pushed against one side of the membrane and an O-ring is located on the other side of the membrane and is pushed over the head portion and into the neck portion so as to trap the membrane between the O-ring and the neck portion.

A disadvantage of such a construction is if the membrane is stretched, or if the O-ring is subjected to high temperature, the O-ring may be forced off the head so that the attachment device falls away from the membrane. This might be dangerous if the balloon bursts, causing the device to become a projectile, or if the device becomes loose while the balloon is being inflated, in which case it might be swallowed.

The present invention seeks to provide a remedy.

Accordingly, the present invention is directed to an attachment device for attachment to a membrane without puncturing the membrane, comprising two interengaging parts and an O-ring held by the interengaging parts when the device is in use, the interengaging parts being movable relative to one another from a position in which they are able to receive the O-ring to a position in which they trap the O-ring, so that when the device is attached to a membrane, the interengaging parts can be located on one side of the membrane with the O-ring on the other side of the membrane adjacent to the interengaging parts, the O-ring can be slipped over at least one of the interengaging parts with the membrane extending between the O-ring and at least one of the interengaging parts, so that the O-ring is received by the interengaging parts, whereupon the interengaging parts may be moved relative to one another so that they trap the O-ring and with it portions of the membrane, to secure attachment of the attachment device to the membrane.

Preferably, the interengaging parts are provided with respective parts of a snap-action fastening to effect entrapment of the O-ring and with it portions of the membrane.

One of the interengaging parts may comprise a spigot and the other of the interengaging parts may comprise a cap which fits over the spigot.

The snap-action device may comprise at least one recess in one of the interengaging parts, and at least one protuberance on the other of the interengaging parts. The protuberance and/or the recess may be mounted on a resilient portion to enable the snap-action. For example, the protuberance may be formed on an inwardly directed portion of the cap, with the recess formed in the outside of the spigot.

A skirt may be provided on one or other of the interengaging parts to surround the O-ring and with it portions of the membrane when the device is in use.

The skirt portion may be part of the cap. Alternatively, it may be an integral portion of or a separate part attached to the interengaging part which comprises the spigot. This has the advantage that when the attachment device is attached to a membrane, and the membrane is stretched into a generally planar condition adjacent to the attachment device, that portion of the membrane which rests against the cap is flush with the portions of the membrane which extend outwardly from the cap.

Advantageously at least two recesses are provided on one of the interengaging parts, spaced apart in the direction of relative movement between the interengaging parts when they are moved from their receiving position to their entrapment position, whereby the other interengagement part can be held by means of the outer one of the said at least two recesses to provide the receiving position, and by the other recess to effect the entrapment position.

An illuminating device may be secured to the attachment device, for example a light emitting diode with at least one battery to illuminate the diode.

Such a device may be attached to the membrane of a balloon, preferably but not exclusively a party balloon, so that the balloon may be illuminated when it is inflated.

Alternatively, it may be attached to the membrane of a balloon which forms part of a device attached when used to an article of value, the device being constructed so that it is automatically inflated and illuminated upon entering water so as to act as an illuminated buoy.

The illumination device may be provided with a switch which can be operated by means which are outside the balloon. For example, the illumination device may comprise a sprung-loaded contact urged by the spring-loading against another contact to create a switch which is held in the off position until use by means of a strip of insulation held between the contacts by the said resilience.

The strip of insulated material may extend to a position outside the balloon so that it may be removed from insulating the contacts from one another simply by being pulled out of the balloon. The balloon may now be inflated by the user either by the user blowing into the balloon or by means of an air pump.

In the case of the construction in the form of a buoy, a portion of the strip which is outside of the balloon may be fixed so that when the balloon is inflated, for example by a small gas cylinder within the device, it is automatically pulled away from the contacts to illuminate the illumination device.

The battery or batteries may be held within a housing of one of the interengaging parts, one side of the housing being open to facilitate insertion of the battery or batteries, and being closed by the said skirt portion when the device is in use.

An example of an attachment device made in accordance with the present invention will now be described in greater detail with reference to the accompanying drawings, in which.

Figure 12:
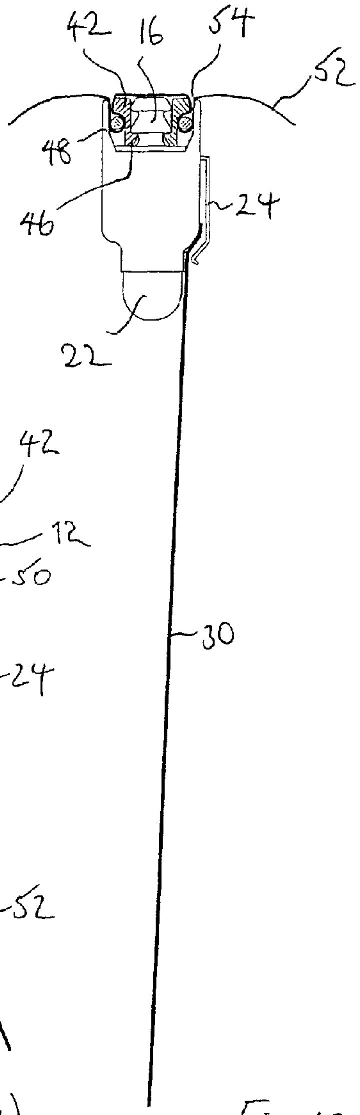
Figure 14:
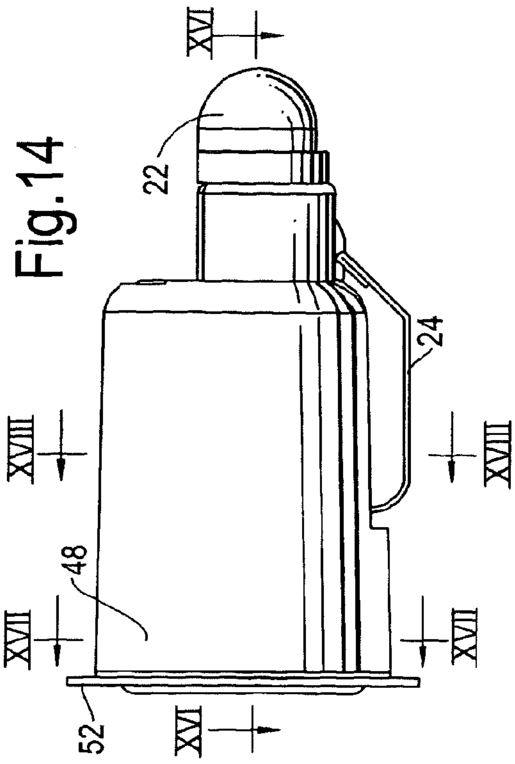
Figure 16:
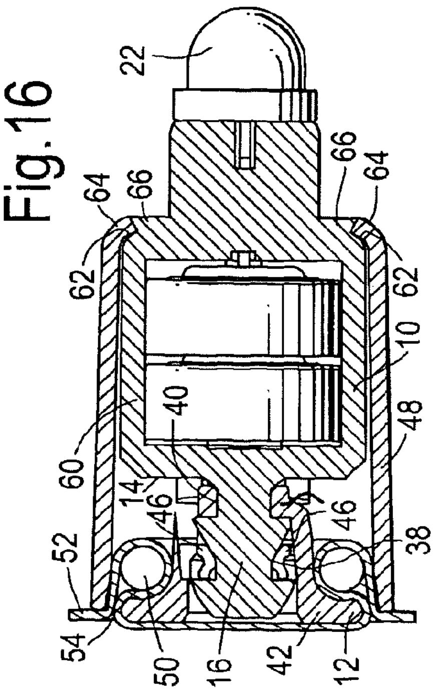
Figure 13:
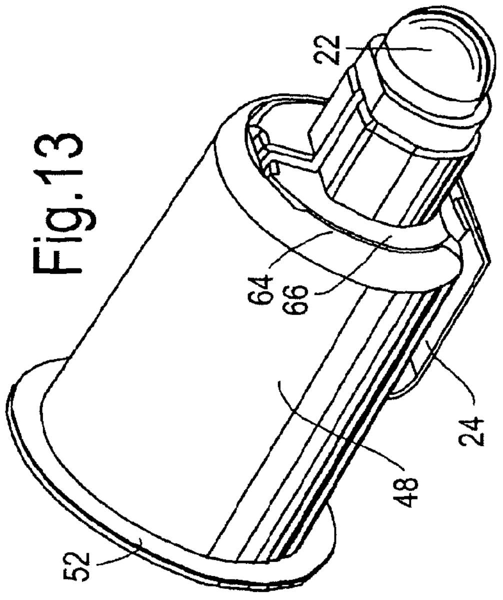
Figure 15:
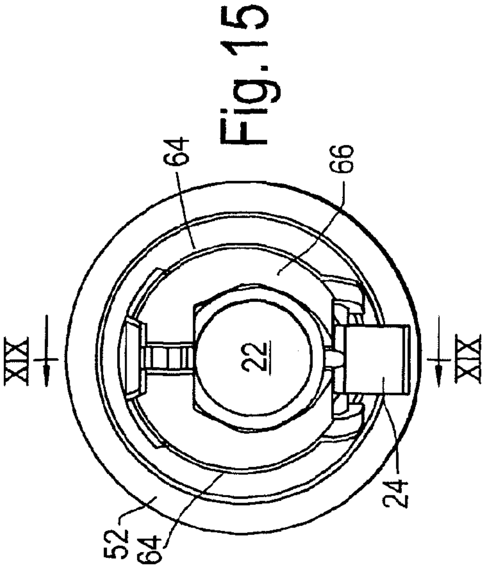
Figure 17:
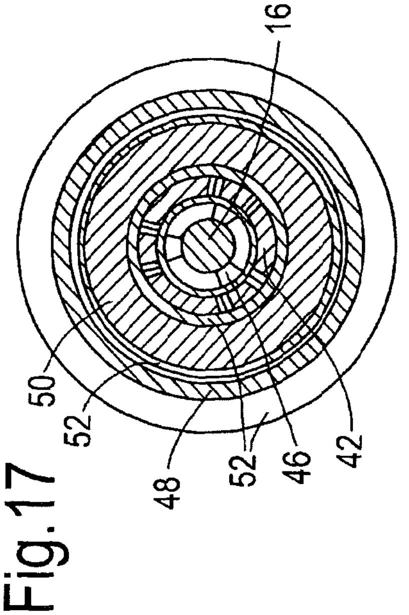
Figure 18:
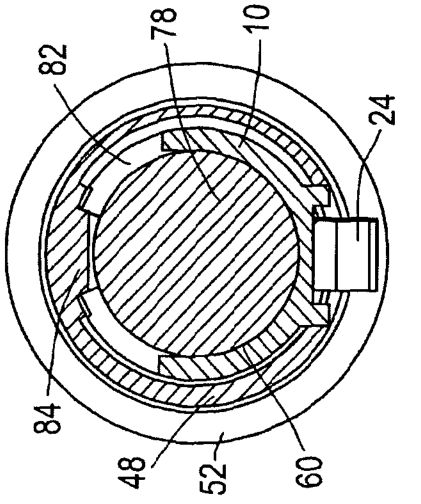
Figure 19:
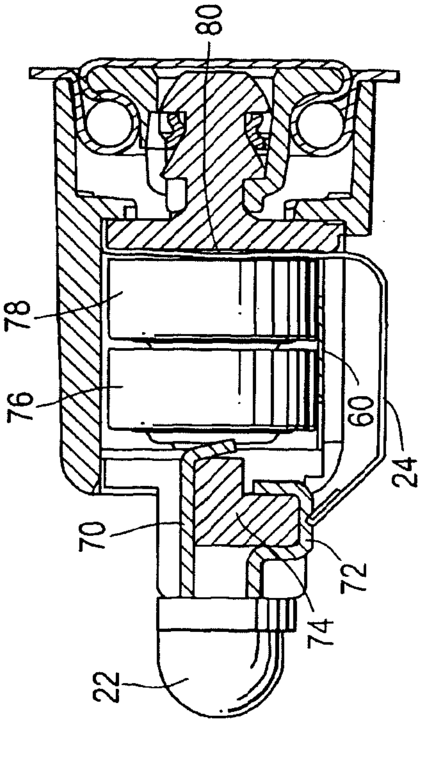

FIGS. 11 (*a*) to (*e*) show on a larger scale parts of the device as shown in FIGS. 3, 4, 5, 6, and 7 respectively;

FIG. 12 shows a side, part sectional view of a modified attachment device embodying the present invention, attached to a portion of a party balloon;

FIG. 13 shows a perspective view from one end of a modification of the attachment device shown in FIG. 12, also embodying the present invention;

FIG. 14 shows a side view of the attachment device shown in FIG. 13;

FIG. 15 shows an end view of the attachment device shown in FIGS. 13 and 14;

FIG. 16 shows an axial sectional view of the attachment device shown in FIGS. 13 to 15, in the plane indicated by the line XVI-XVI shown in FIG. 14;

FIGS. 17 and 18 show respective cross-sectional views of the attachment device shown in FIGS. 13 to 15, in the planes indicated by the lines XVII-XVII and XVIII-XVIII respectively shown in FIG. 14; and FIG. 19 shows a further axial sectional view of the attachment device shown in FIGS. 13 to 15, in the plane indicated by the line XIX-XIX in FIG. 15.

Figure 1:
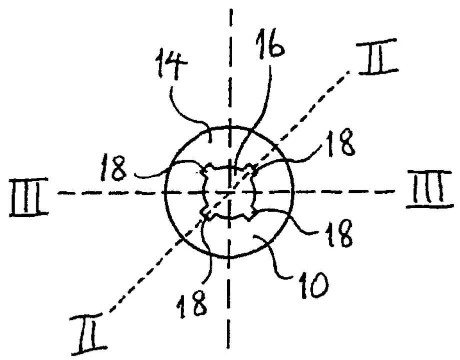
FIG. 1 shows a plan view of a first engagement part an attachment device embodying the present invention.
Figure 2:
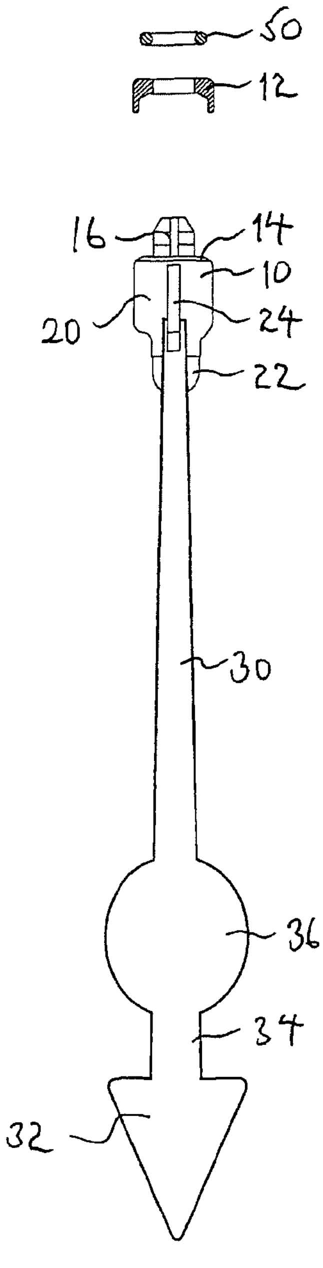
FIG. 2 shows a part side, part exploded, part axial sectional view of the attachment device of which a first interengaging part is shown in FIG. 1, taken in the plane defined by the broken lines II-II in FIG. 1.

FIG. 1 shows an intended lower one 10 of two interengaging parts 10 and 12 shown in FIGS. 2 to 10. The part 10 shown in FIG. 1 comprises a shoulder portion 14 and a spigot 16 extending upwardly from the shoulder portion with four fins 18 extending upwardly from the shoulder portion along the side of the spigot and spaced apart equiangularly between one another around the axis of the spigot 16, therefore with 90° angular spacing between adjacent fins.

As shown in FIGS. 2 to 11, below the shoulder portion 14 of the part 10 there is a battery housing 20 and attached to the lower end of the battery housing 20 there is a light emitting diode 22. The parts 14 to 20 are made integrally as a single piece plastics moulding. Extending from the inside of the housing 20 on one side of two button cell batteries (not shown) within the housing and downwardly along the outside of the housing 20 to a position at the lower end of the housing, there is a resilient metal spring strip contact 24. The spring contact 24 is under strain such that its lower end 26 is urged into contact with a second metal strip 28 which extends into a lower end of the housing 20. The strip 28 is in contact with one side of the diode 22, the other side of which is connected electrically to one end of the batteries (not shown) within the housing 20. The upper end of the batteries is in electrical contact with the upper end of the contact strip 24. A thin electrically-insulating plastics laminated paper tag 30 has an upper end held between the spring contact 24 and the opposing contact 28 so as to insulate these contacts from one another. The lower end of the tag has a triangular pull tab 32. Above the tab 32 there is a narrowed portion 34 of the tag and then a widened portion 36 progressing in an upward direction.

Figure 3:
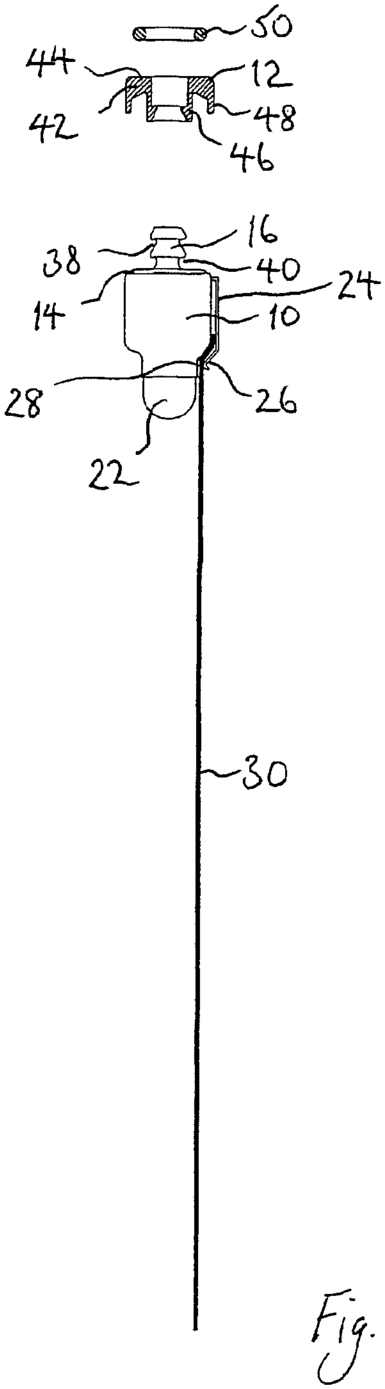
FIG. 3 shows a view corresponding to that of FIG. 2 but with the partial cross-section taken in the plane defined by the broken lines III-III shown in FIG. 1, albeit for the sake of clarity with some portions of the device rotated around the axis thereof by 90° instead of the angle between the planes II-II and III-III of 45°.

As can be seen in FIGS. 3 and 11(*a*), the spigot 16 is formed with a first ring of recesses 38 located between adjacent fins 18 and extending around the spigot 16 at an upper level relative to the shoulder portion 14, and a second such series of recesses 40 at a lower level closer to the shoulder portion 14.

The intended upper interengaging part 12 of the attachment device is in the form of an inwardly directed cap 42 having a lid part 44 and downwardly extending resiliently sprung barbs 46 each with a respective inwardly directed protuberance. A skirt portion 48 extends downwardly from the periphery of the lid part 44 of the cap 42, so that an annular recess is defined between the skirt 48 and the barbs 46.

The attachment device further comprises an O-ring 50 having a diameter which is less than the diameter of the lid 44, being such that the O-ring 50 will fit snugly in the recess between the skirt 48 and the barbs 46.

The cap 42 comprising the parts 42 to 48 is formed as a single integrally moulded plastics component.

The barbs 46 and recesses 38 and 40 constitute a snap-action fastening device.

Figure 4:
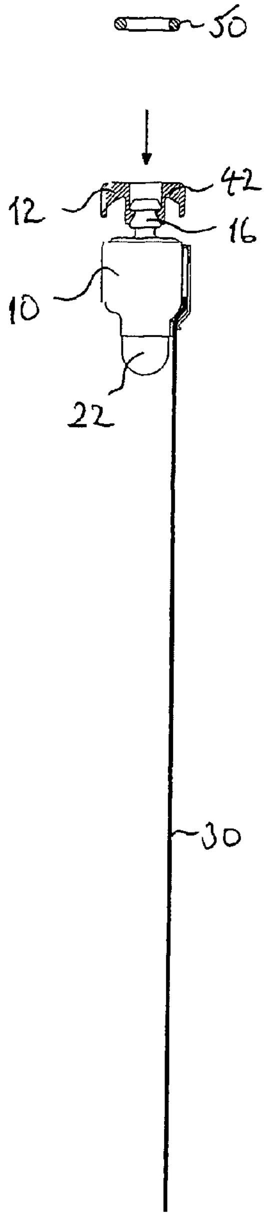
FIG. 4 shows a view corresponding to that shown in FIG. 3 with interengaging parts of the device in a first relative position.
Figure 5:
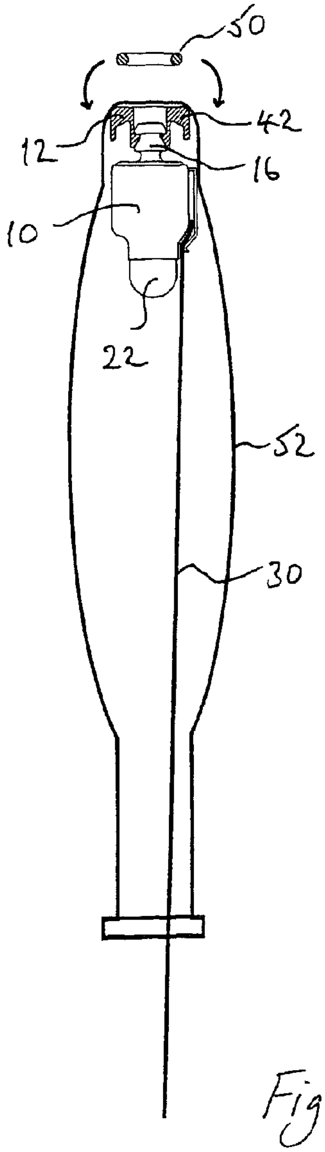
FIG. 5 shows a view corresponding to that of FIG. 4 with the addition of a party balloon into which the interengaging parts of the device have been inserted.
Figure 6:
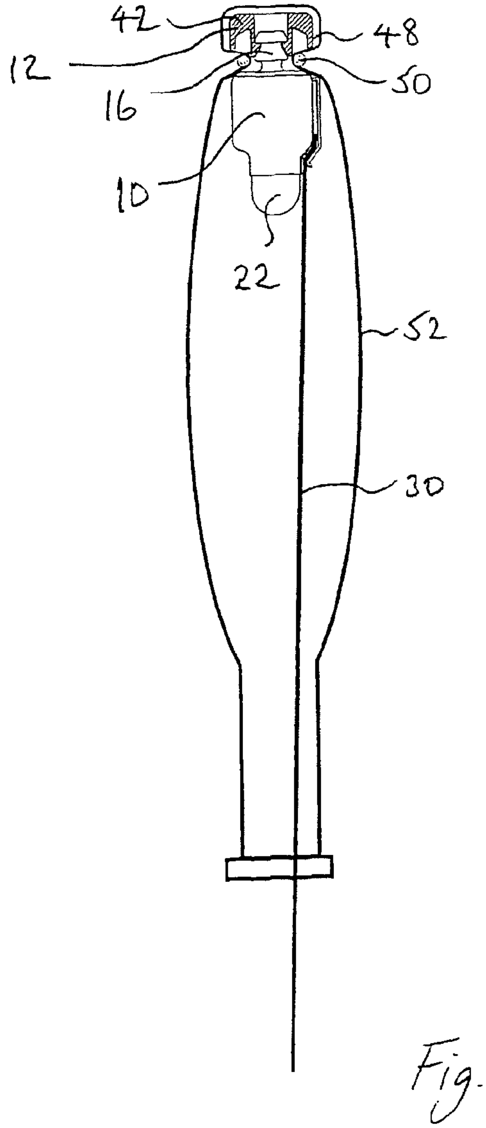
FIG. 6 shows a view corresponding to that of FIG. 5 in which an O-ring of the device has been slid over a cap of the device.

When the attachment device is prepared for use, the cap 42 is placed on the spigot 16 and urged in an intended downward direction until the barbs 46 snap into the upper ring of recesses 38, as shown in FIGS. 4 and 11(*b*). With the interengaging parts 10 and 12 thus assembled, they are inserted into a party balloon 52 and the cap 42 is positioned on the inside of the intended uppermost part of the balloon as shown in FIGS. 5 and 11(*c*). With the rubber membrane of the balloon stretched over the cap 42, the O-ring 50 is slid over the cap 42, with portions of the membrane of the balloon 52 located between the cap 42 and the O-ring 50. As shown in FIGS. 6 and 11(*d*), the O-ring 50 is slid to a position below the skirt 48 so that it is now located around the lower end of the spigot 16, with portions of the membrane of the balloon 52 located between the O-ring 50 and the spigot 16.

Figure 7:
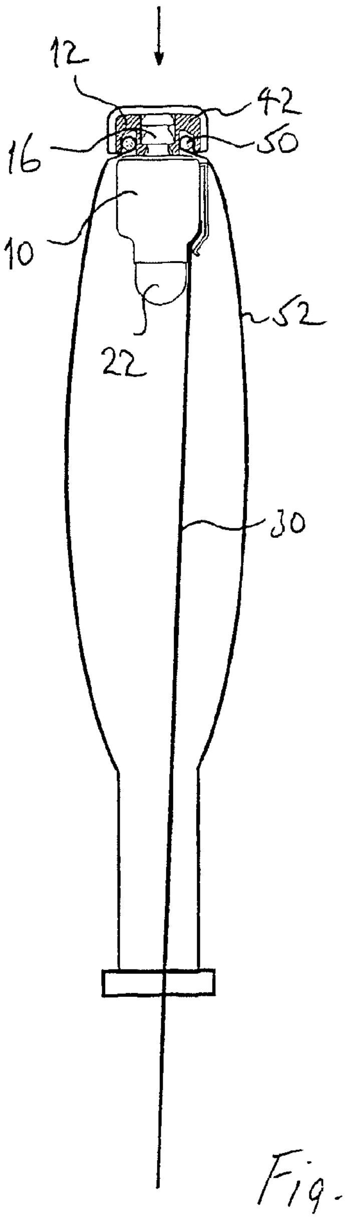
FIG. 7 shows a view corresponding to that of FIG. 6 in which the interengaging parts have been moved relative to one another into a second relative position.
Figure 8:
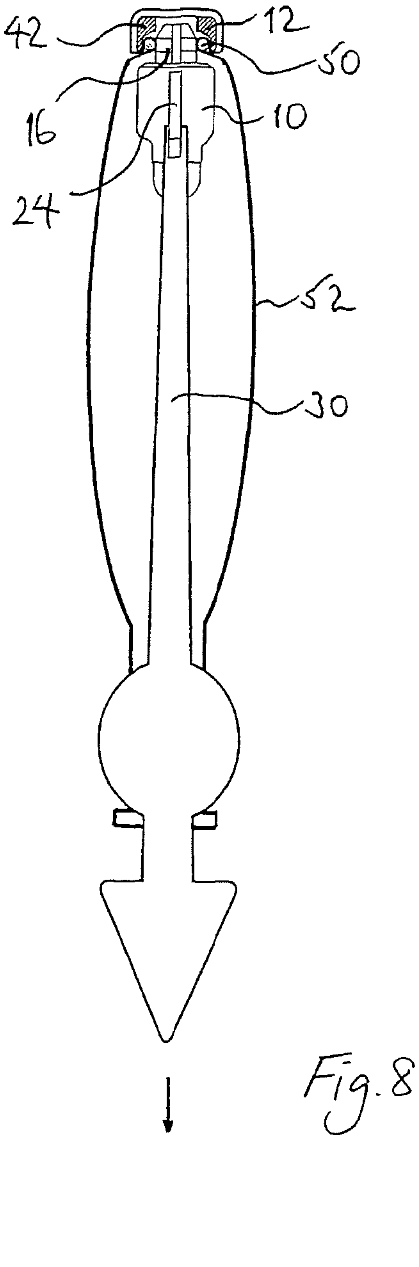
FIG. 8 shows a view corresponding to FIG. 7 viewing the device in the same direction as in the direction of view of FIG. 2.

As shown in FIGS. 7, 8 and 11(*e*), the cap 42 is now pressed downwardly relative to the spigot 16 until the barbs 46 snap into the lower ring of recesses 40. The fins 18 reduce the likelihood that the barbs 46 will be obstructed by the O-ring 50 during this relative movement between the cap 42 and the spigot 16. This permanently locks the cap 42 and the spigot 16 with the O-ring 50 trapped within the cavity defined by the skirt 48, the lid 44, the barbs 46, and the shoulder portion 14, with the O-ring 50 and the cap 42 being surrounded by portions of the balloon membrane.

Figure 9:
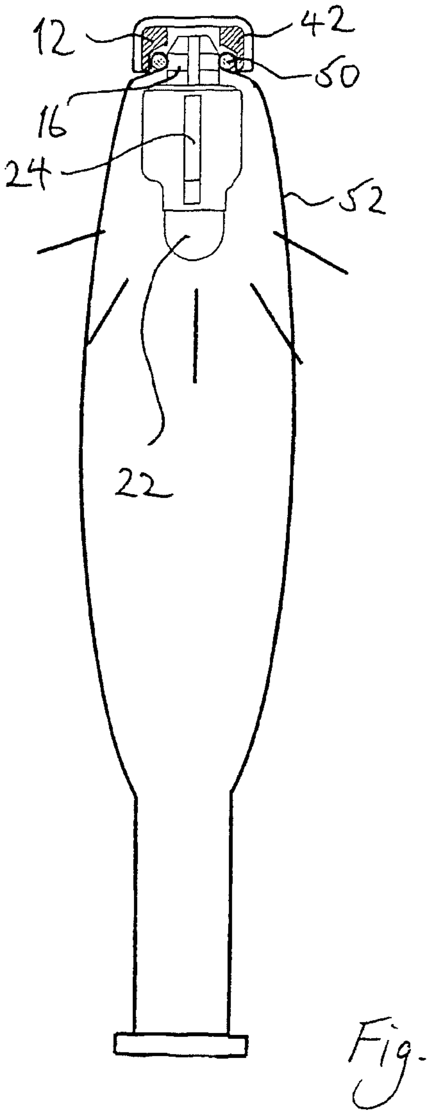
FIG. 9 shows a view corresponding to FIG. 8 in which a portion of the device has been removed.
Figure 10:
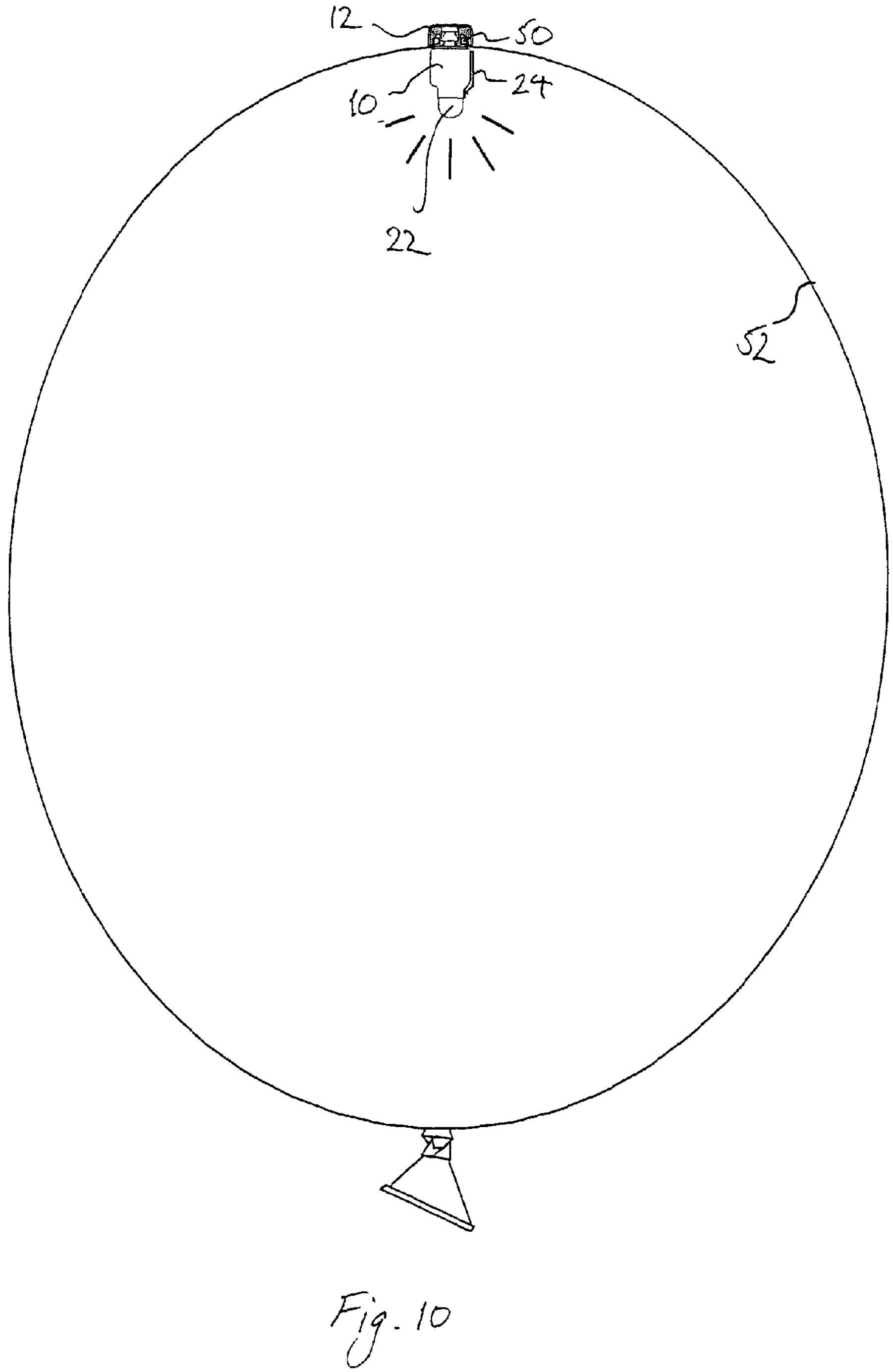
FIG. 10 shows a view corresponding to that of FIG. 9 with the balloon inflated.

When the balloon is ready for use, the tag 32 is used to pull the strip 30 out of the balloon. This enables the spring contact 24 to make electrical contact with the inner contact 28 so that the LED 22 is illuminated as shown in FIG. 9. The balloon may now be inflated so that the diode 22, battery housing 20 and attachment device are all securely attached to the intended top of the end with the diode 22 located within and illuminating the inside of the balloon, as shown in FIG. 10. Provided the rubber material of the balloon is of a cloudy translucent nature, the presence of an illuminated diode within the balloon gives the impression that the whole balloon is glowing, especially if it is viewed in the dark.

Figure 10A:
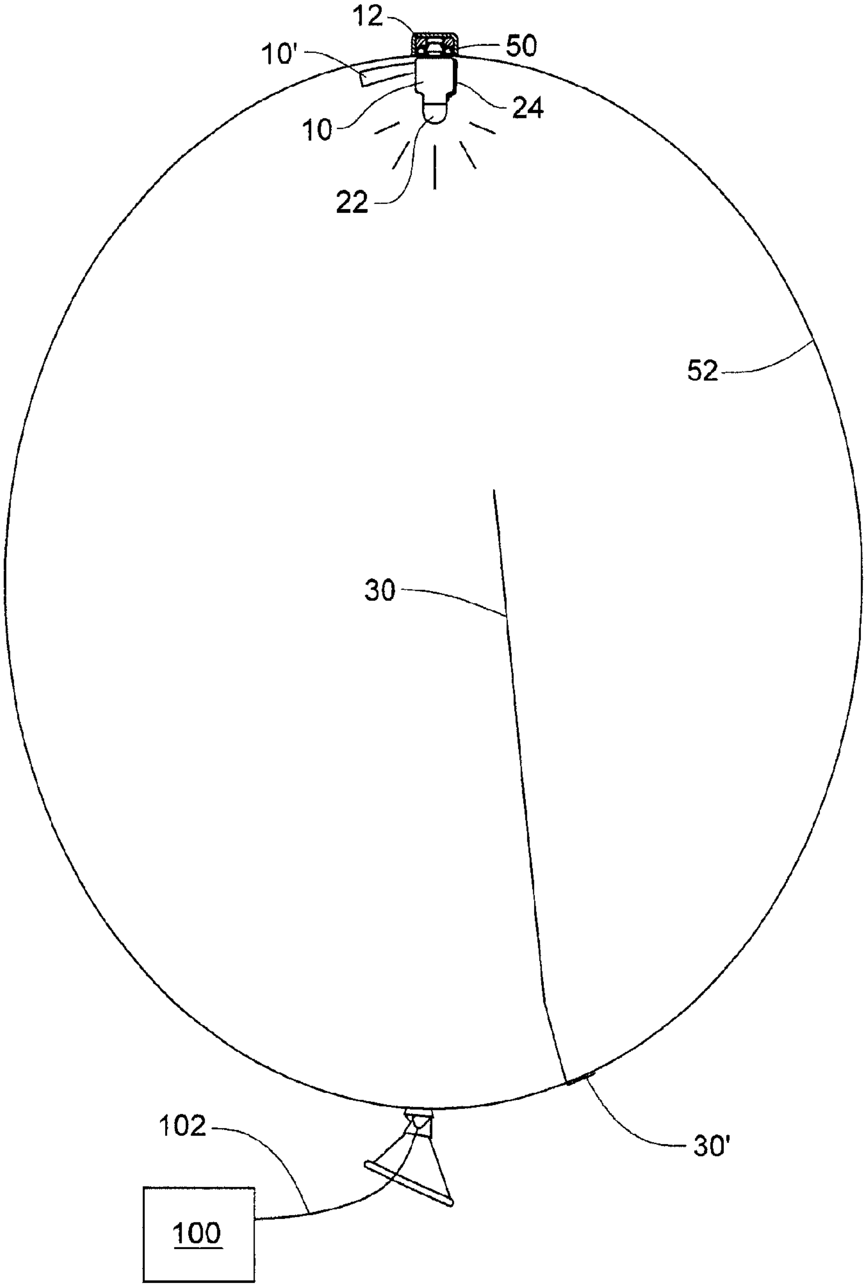
FIG. 10A shows an embodiment wherein an inflated balloon is attached to an article of value and used as a buoy.
Figure 11A:
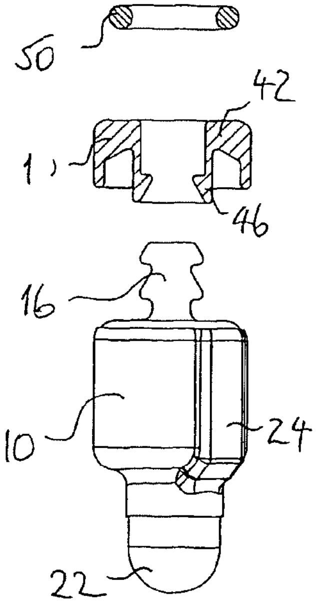
Figure 11B:
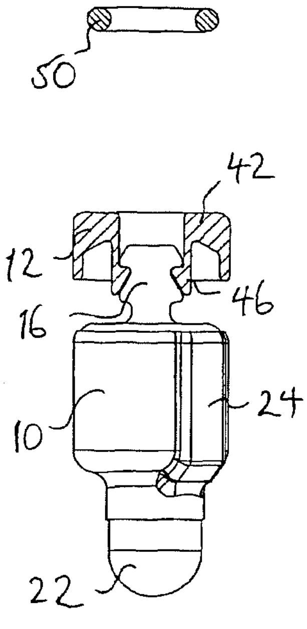
Figure 11C:
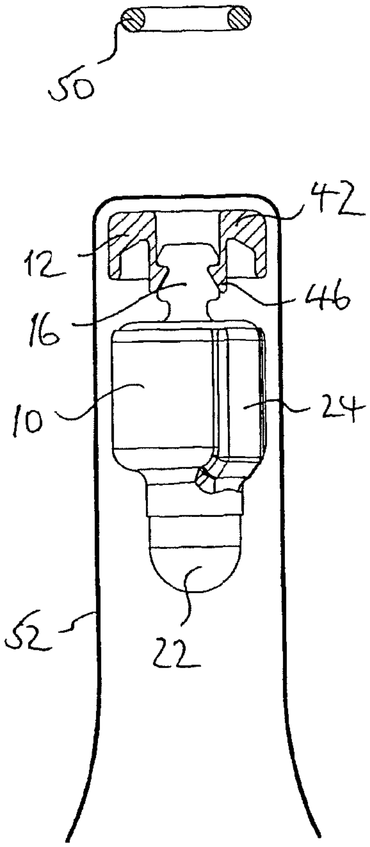
Figure 11D:
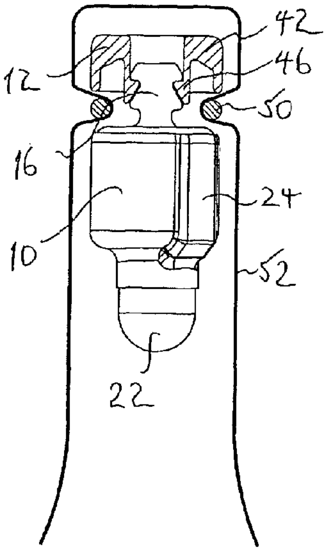
Figure 11E:
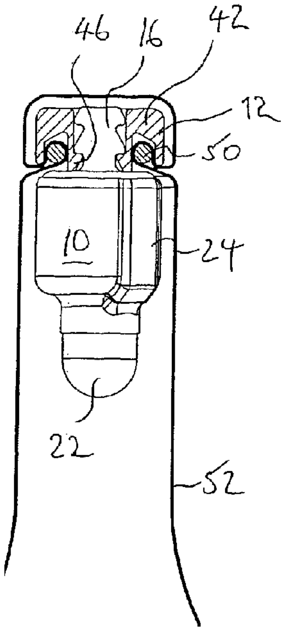

With reference to FIG. 10A, the balloon 52 forms part of a device attached to an article of value 100 by element 102, the device being constructed so that the balloon is automatically inflated and illuminated upon entering water so as to act as an illuminated buoy.

As illustrated in FIG. 10A, a portion 30' of the strip 30 is located outside of the balloon and is fixed so that when the balloon is inflated the strip 30 is automatically pulled away from the contacts to illuminate the illumination device. The inflation may be provided by a small water-activated gas cylinder as shown at 10', which devices are known in the art.

In the modification as shown in FIG. 12, the skirt 48, instead of extending downwardly from the lid 44 of the cap 42, can be made integrally with the lower of the two interengaging parts, and extend upwardly from the shoulder portion 14, as shown in FIG. 12, the diameter of the lid 44 of the cap 42 being reduced so that it is somewhat less than the inner diameter of the skirt 48, thus providing a small annular aperture 54 between the lid 42 and the skirt 48 which is wide enough for portions of the balloon 52 membrane to extend through, but not wide enough for the O-ring 50 to escape. An advantage of such a modification is that the portion of the membrane that extends over the cap 42 is flush with the portion of membrane which extends outwardly from the cap 42 when the balloon is inflated.

The modified attachment device made in accordance with the present invention as shown in FIGS. 14 to 19 has component parts numerically labelled such that those parts of the construction illustrated in these drawings which correspond to parts of the embodiment shown in FIGS. 1 to 12 have been given the same reference numerals. The main differences between the construction shown in FIGS. 14 to 19 and that shown in FIG. 12 are (a) in the construction of the skirt 48 which is made as a separate component attached to the engaging part 10, and (b) the presence of two levels of barbs 46 on the cap 42 respectively engaging the upper and lower levels of recesses 38 and 40 of the spigot 16.

The interengaging part 10 comprises a battery housing 60 having shoulder portions 62 at an end of the housing 60 further from the spigot 16 over which inwardly curved lips 64 at an end of the skirt 48 snap-fit. Chamfered end surfaces of those inwardly curved portions 64 abut an adjacent dovetail portion 66 of the housing 60.

FIG. 19 shows more clearly how the circuit of the attachment device is completed. Thus, the light emitting diode 22 is provided with two electrical contacts 70 and 72 spaced apart by an insulating member 74. The contact 70 abuts the positive terminal of a disc or button battery 76 held within the housing 60. The negative side of the battery 76 in turn abuts the positive side of a further disc or button battery 78 also held within the housing and stacked against the battery 76. The negative side of the disc battery 78 abuts an internal part 80 of the resilient metal strip contact 24. The latter extends back to and springingly engages with the other contact 72 of the light emitting diode 22 to complete the electrical circuit.

FIG. 18 shows how the housing 60 is provided with an open side 82 to enable the batteries 76 and 78 to be snap-fitted into the housing 60 whereafter the sleeve 48 can be slid over the housing 60 until the inwardly curved lips 64 snap-fit over the dovetail portion 66 and onto the shoulders 62. The skirt 48 is provided with an inwardly protruding integral pad 84 which abuts the batteries 76 and 78 to secure them in position. As shown in FIGS. 2 to 8, the assembly is completed by the insertion of one end of a plastics laminated paper tag between the spring strip 24 and the diode contact 72.

The parts 14 to 20, or 14, 16 and 60 with batteries inside the housing 20 or 60, may be encased in a plastics covering which is smooth, to reduce the risk of burrs cutting the membrane, and to increase the safety of the device as a whole.

Numerous variations and modifications to the device illustrated in the Figures may occur to the reader without taking the resulting construction outside the scope of the present invention. For example, there may be fewer or more than four fins 18, such as three or five fins. Whatever the number of fins, they are preferably but not necessarily equiangularly spaced. The LED 22 may be replaced by a different illuminating device, such as an OLED. Other cells than button cells 76, 78 may be used, and there may be only one or there may be more than two. The spring strip contact 24 may be omitted, with a different conductive element completing the electrical circuit, and with an end of the strip 30 being inserted between the button batteries 76, 78, or between the button battery 76 and the LED contact 70, for example, prior to use. The attachment device may be attached to some part other than the intended top or uppermost part of the balloon 52.

It will be appreciated that attachment devices in accordance with the present invention may be used on membranes other than party balloon membranes, or retrieval balloon membranes, for example hot air balloon membranes, commercial or scientific balloon membranes, or indeed membranes of any larger balloon, and for membranes other than balloon membranes, for example membranes used for medical purposes.

The invention claimed is:

1. An attachment device for attachment to a membrane without puncturing the membrane, comprising two interengaging parts and an O-ring held by the interengaging parts when the device is in use, the interengaging parts being movable relative to one another from a position in which they are able to receive the O-ring to a position in which they trap the O-ring, so that when the device is attached to a membrane, the interengaging parts can be located on one side of the membrane with the O-ring on the other side of the membrane adjacent to the interengaging parts, the O-ring can be slipped over at least one of the interengaging parts with the membrane extending between the O-ring and at least one of the interengaging parts, so that the O-ring is received by the interengaging parts, whereupon the interengaging parts may be moved relative to one another so that they trap the O-ring and with it portions of the membrane, to secure attachment of the attachment device to the membrane.

2. An attachment device according to claim 1, in which one of the interengaging parts comprises a spigot and the other of the interengaging parts comprises a cap which fits over the spigot.

3. An attachment device according to claim 1, in which the interengaging parts are provided with respective parts of a snap-action fastening to effect entrapment of the O-ring and with it portions of the membrane.

4. An attachment device according to claim 3, in which the snap-action fastening comprises at least one recess in one of the interengaging parts, and at least one protuberance on the other of the interengaging parts.

5. An attachment device according to claim 4, in which at least one of the protuberance and the recess is mounted on a resilient portion to enable the snap-action.

6. An attachment device according to claim 4, in which the protuberance is formed on an inwardly directed portion of the cap, with the recess formed in the outside of the spigot.

7. An attachment device according to claim 1, in which a skirt portion is provided on one or other of the interengaging parts to surround the O-ring and with it portions of the membrane when the device is in use.

8. An attachment device according to claim 2 in which a skirt portion is provided on one or other of the interengaging parts to surround the O-ring and with it portions of the membrane when the device is in use, and in which the skirt portion is part of the cap.

9. An attachment device according to claim 2 in which a skirt portion is provided on one or other of the interengaging parts to surround the O-ring and with it portions of the membrane when the device is in use, and, in which the skirt portion is an integral portion of the interengaging part which comprises the spigot.

10. An attachment device according to claim 7, in which the skirt portion is a separate part which is attached to the interengaging part which comprises the spigot.

11. An attachment device according to claim 1, in which at least two recesses are provided on one of the interengaging parts, spaced apart in the direction of relative movement between the interengaging parts when they are moved from their receiving position to their entrapment position, whereby the other interengagement part can be held by means of the outer one of the said at least two recesses to provide the receiving position, and by the other recess to effect the entrapment position.

12. An attachment device according to claim 1, in which an illuminating device is secured to the attachment device.

13. An attachment device according to claim 12, in which the illuminating device comprises a light emitting diode.

14. An attachment device according to claim 12, provided with at least one battery to illuminate the illuminating device.

15. An assembly comprising a balloon to the membrane of which is attached an attachment device as claimed in 12, so that the balloon may be illuminated when it is inflated.

16. An assembly according to claim 15 wherein the balloon is automatically inflated and illuminated upon entering water so as to act as an illuminated buoy.

17. An assembly according to claim 15 in which the illumination device is provided with a switch which can be operated by means which are outside the balloon.

18. An assembly according to claim 17, in which the illumination device comprises a sprung-loaded contact urged by the spring-loading against another contact to create a switch which is held in the off position until use by means of a strip of insulation held between the contacts by the said resilience.

19. An assembly according to claim 18, in which the strip of insulation extends to a position outside the balloon so that it may be removed from insulating the contacts from one another simply by being pulled out of the balloon.

20. An assembly according to claim 18 in which a portion of the strip of insulation is fixed so that when the balloon is inflated, the strip is automatically pulled away from the contacts to illuminate the illumination device.

21. An attachment device according to claim 14, in which the battery or batteries are held within a housing of one of the interengaging parts, one side of the housing being open to facilitate insertion of the battery or batteries into the housing, and being closed by a skirt portion when the device is in use.

* * * * *